US011257492B2

(12) United States Patent
Chang (10) Patent No.: US 11,257,492 B2
(45) Date of Patent: Feb. 22, 2022

(54) VOICE INTERACTION METHOD AND APPARATUS FOR CUSTOMER SERVICE

(71) Applicant: BAIDU ONLINE NETWORK TECHNOLOGY (BEIJING) CO., LTD., Beijing (CN)

(72) Inventor: Xiantang Chang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 116 days.

(21) Appl. No.: 16/354,794

(22) Filed: Mar. 15, 2019

(65) Prior Publication Data

US 2020/0007684 A1 Jan. 2, 2020

(30) Foreign Application Priority Data

Jun. 29, 2018 (CN) .......................... 201810717154.0

(51) Int. Cl.
*G10L 15/22* (2006.01)
*G06F 16/9032* (2019.01)
(Continued)

(52) U.S. Cl.
CPC ........ *G10L 15/22* (2013.01); *G06F 16/90332* (2019.01); *G06Q 30/016* (2013.01); *G10L 15/26* (2013.01); *H04M 3/5183* (2013.01)

(58) Field of Classification Search
CPC ..................................................... G10L 15/22
See application file for complete search history.

(56) References Cited

U.S. PATENT DOCUMENTS 6,298,324 B1 * 10/2001 Zuberec .................. G10L 15/19
704/251
6,314,165 B1 * 11/2001 Junqua .................... G10L 15/26
379/216.01
(Continued)

FOREIGN PATENT DOCUMENTS

CN 1988548 6/2007
CN 103428355 12/2013
(Continued)

OTHER PUBLICATIONS

Japanese Office Action for Japanese Application No. 2019-046997, dated Aug. 31, 2021, 3 pages.

*Primary Examiner* — Douglas Godbold
(74) *Attorney, Agent, or Firm* — Seed IP Law Group LLP (57) ABSTRACT

Embodiments of the present disclosure provide a voice interaction method and apparatus for a customer service. The method includes: receiving customer demand information from a customer demand end, the customer demand information including a customer demand end identifier and a voice demand instruction; performing a speech recognition on the voice demand instruction; and if a demanded service type in the voice demand instruction is identified, sending a service-providing request to a service management system based on the demanded service type, the service-providing request including the customer demand end identifier and the demanded service type. The embodiments of the present disclosure realize the interaction between the customer demand end, the service management system and the customer by adopting the voice interaction method, so that the customer's demand can be quickly and intelligently recognized and the corresponding service can be provided.

12 Claims, 3 Drawing Sheets

(51) Int. Cl.
  *G06Q 30/00* (2012.01)
  *H04M 3/51* (2006.01)
  *G10L 15/26* (2006.01)

(56) References Cited

U.S. PATENT DOCUMENTS

| | | | |
|---|---|---|---|
| 10,580,098 B2 * | 3/2020 | Gulec | G07C 1/10 |
| 2002/0107695 A1 * | 8/2002 | Roth | G10L 15/22 |
| | | | 704/275 |
| 2002/0169618 A1 * | 11/2002 | Caspari | G10L 15/22 |
| | | | 704/275 |
| 2005/0182631 A1 | 8/2005 | Lee et al. | |
| 2006/0085184 A1 * | 4/2006 | Marcus | G10L 15/22 |
| | | | 704/234 |
| 2017/0123757 A1 * | 5/2017 | Lancaster | G06K 9/00355 |
| 2017/0124311 A1 * | 5/2017 | Li | G10L 17/02 |
| 2017/0282373 A1 * | 10/2017 | Kondo | B25J 9/1697 |
| 2018/0012595 A1 * | 1/2018 | Weingartner | H04L 65/1083 |
| 2018/0167516 A1 | 6/2018 | Warrick | |
| 2018/0211666 A1 * | 7/2018 | Kolavennu | G10L 13/00 |
| 2018/0342021 A1 * | 11/2018 | Gulec | G06F 15/7839 |
| 2019/0279620 A1 * | 9/2019 | Talwar | G10L 15/32 |
| 2019/0279636 A1 * | 9/2019 | Woodall | G06F 3/017 |
| 2020/0335100 A1 * | 10/2020 | Saon | G10L 15/063 |

FOREIGN PATENT DOCUMENTS

| | | |
|---|---|---|
| CN | 103944598 | 7/2014 |
| CN | 104301522 | 1/2015 |
| CN | 105205746 | 12/2015 |
| CN | 105702254 | 6/2016 |
| CN | 106057204 | 10/2016 |
| CN | 106506568 | 3/2017 |
| CN | 107092364 | 8/2017 |
| CN | 107180635 | 9/2017 |
| CN | 107220292 | 9/2017 |
| CN | 107749866 | 3/2018 |
| CN | 107833574 | 3/2018 |
| JP | 2000-032140 A | 1/2000 |
| JP | 2016-163236 A | 9/2016 |
| JP | 2017-530387 A | 10/2017 |
| WO | 2015/029379 | 3/2015 |

* cited by examiner

VOICE INTERACTION METHOD AND APPARATUS FOR CUSTOMER SERVICE

CROSS-REFERENCE TO RELATED APPLICATIONS

This application claims priority to Chinese Patent Application No. 201810717154.0, filed on Jun. 29, 2018, titled "Voice Interaction Method and Apparatus for Customer Service," which is hereby incorporated by reference in its entirety.

TECHNICAL FIELD

The present disclosure relates to the field of artificial intelligence technologies, specifically to a voice interaction method and apparatus for a customer service.

BACKGROUND

In the existing technology, when a guest needs a customer service, he needs to contact the hotel service staff through the telephone in the hotel room. However, the process is not user-friendly. Since the guest is not familiar with the hotel phone, he/she needs to check the service desk phone before making a call, which may waste time. Moreover, if multiple guests make phone calls to the service desk at the same time in a short period, a problem of engaged line may be caused, thus the customer demand problem can not be solved in time for the guests. In addition, installing a telephone in each room of the hotel and arranging the corresponding customer service staff to answer the phone may increase the operating costs of the hotel.

The above information disclosed in the Background is only for enhancing understanding of the background of the present disclosure, therefore, the above information may contain information being not the existing technology known to those skilled in the art.

SUMMARY

Embodiments of the present disclosure provide a voice interaction method and apparatus for a customer service, to solve one or more technical problems in the existing technology.

In a first aspect, the embodiments of the present disclosure provide a voice interaction method for a customer service, including:

receiving customer demand information from a customer demand end, the customer demand information including a customer demand end identifier and a voice demand instruction;

performing a speech recognition on the voice demand instruction; and if a demanded service type in the voice demand instruction is identified, sending a service-providing request to a service management system based on the demanded service type, the service-providing request including the customer demand end identifier and the demanded service type.

In combination with the first aspect, in a first implementation of the first aspect according to an embodiment of the present disclosure, the method further includes:

feeding back a service-providing result to the customer demand end, based on the customer demand end identifier.

In combination with the first aspect, in a second implementation of the first aspect according to an embodiment of the present disclosure, the performing a speech recognition on the voice demand instruction, includes:

converting the voice demand instruction into demand text information;

matching the demand text information with legal text information recorded in a database; and determining that the recognition is successful, if the legal text information including an identical content as a content of the demand text information in the database is found through the matching.

In combination with the first aspect, in a third implementation of the first aspect according to an embodiment of the present disclosure, the sending a service-providing request to a service management system based on the demanded service type, includes:

finding a corresponding room number based on the customer demand end identifier; and sending the service-providing request including the room number and the demanded service type to the service management system.

In combination with the first implementation of the first aspect according to an embodiment of the present disclosure, in a fourth implementation of the first aspect, the feeding back a service-providing result to the customer demand end, based on the customer demand end identifier, includes:

generating feedback text information based on the demanded service type;

converting the feedback text information into a feedback voice; and sending the feedback voice to a voice interaction device of the customer demand end corresponding to the customer demand end identifier.

In a second aspect, the embodiments of the present disclosure provide a voice interaction apparatus for a customer service, including:

a receiving module, configured to receive customer demand information from a customer demand end, the customer demand information including a customer demand end identifier and a voice demand instruction;

a recognition module, configured to perform a speech recognition on the voice demand instruction; and a request-sending module, configured to, if a demanded service type in the voice demand instruction is identified, send a service-providing request to a service management system based on the demanded service type, the service-providing request including the customer demand end identifier and the demanded service type.

In one possible design, the apparatus further includes:

a feedback module, configured to feed back a service-providing result to the customer demand end, based on the customer demand end identifier.

In one possible design, the recognition module includes:

a first conversion submodule, configured to convert the voice demand instruction into demand text information;

a matching submodule, configured to match the demand text information with legal text information recorded in a database; and determine that the recognition is successful, if the legal text information including an identical content as a content of the demand text information in the database is found through the matching.

In one possible design, the request-sending module includes:

a querying submodule, configured to find a corresponding room number based on the customer demand end identifier; and a first sending submodule, configured to send the service-providing request including the room number and the demanded service type to the service management system.

In one possible design, the feedback module includes:

a generation submodule, configured to generate feedback text information based on the demanded service type;

a second conversion submodule, configured to convert the feedback text information into a feedback voice; and a second sending submodule, configured to send the feedback voice to a voice interaction device of the customer demand end corresponding to the customer demand end identifier.

In a third aspect, the embodiments of the present disclosure provide a voice interaction terminal for a customer service, including:

functions which may be implemented by hardware or by performing corresponding software using the hardware. The hardware or software includes one or more modules corresponding to the functions described above.

In a possible design, the structure of the voice interaction terminal for a customer service includes a processor and a memory. The memory is configured to store a program for a voice interaction terminal that supports a customer service to perform the voice interaction method for a customer service in the first aspect. The processor is configured to execute the program stored in the memory. The voice interaction terminal for a customer service may further include a communication interface used for the communication between the voice interaction terminal for a customer service and other devices or the communication network.

In a fourth aspect, the embodiments of the present disclosure provide a computer readable storage medium, configured to store computer software instructions used by a voice interaction terminal for a customer service, the instructions including a program involved in achieving the voice interaction method for a customer service in the first aspect by the voice interaction terminal for a customer service.

A technical solution of the foregoing technical solutions has the following advantages or beneficial effects: the embodiments of the present disclosure realize the interaction between the customer demand end, the service management system and the customer by adopting the voice interaction method, so that the demand of the customer can be quickly and intelligently identified and the corresponding service can be provided.

The above description is for the purpose of illustration only and is not intended to be limiting. In addition to the illustrative aspects, embodiments and features described above, further aspects, embodiments and features of the present disclosure will be readily apparent by reference to the accompanying drawings and the following detailed description.

BRIEF DESCRIPTION OF THE DRAWINGS

In the accompanying drawings, unless otherwise specified, the same reference numerals throughout the accompanying drawings are used to refer to the same or similar parts or elements. The accompanying drawings are not necessarily to drawn to scale. It should be understood that the accompanying drawings are only illustrative of some embodiments of the present disclosure, and are not to be construed as limiting the scope of the present disclosure.

DETAILED DESCRIPTION OF EMBODIMENTS

In the following, only exemplary embodiments are briefly described. The described embodiments may be modified in various different ways, without departing from the spirit and scope of the present disclosure, as may be understood by those skilled in the art. Accordingly, the accompanying drawings and description are regarded as illustrative rather limiting in nature.

Figure 1:
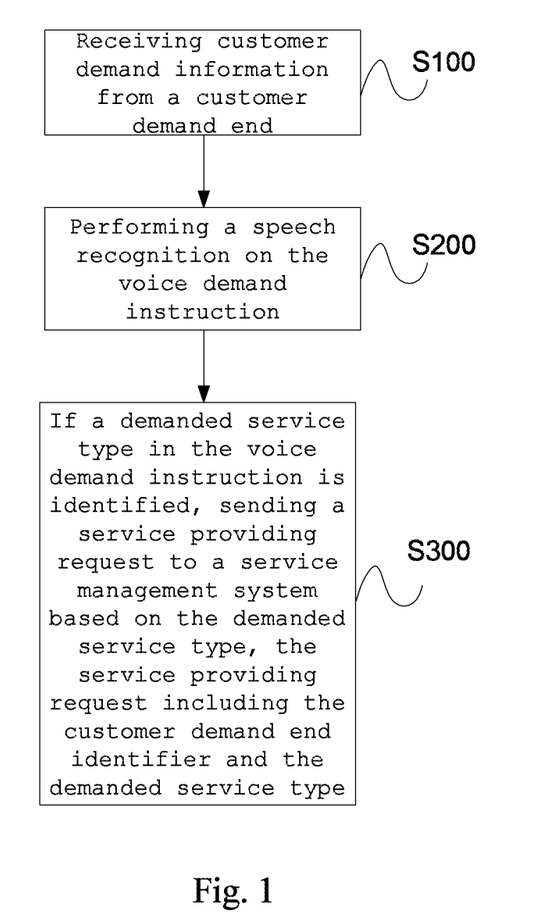
FIG. 1 is a flowchart of a voice interaction method for a customer service according to an embodiment of the present disclosure.

The embodiments of the present disclosure provide a voice interaction method for a customer service. As shown in FIG. 1, the method includes the following steps S100 to S300.

S100 includes: receiving customer demand information from a customer demand end, the customer demand information including a customer demand end identifier and a voice demand instruction.

The customer demand end identifier is used to determine specific location information of the customer demand end. The customer demand end identifier may include an identifier of the device sending the customer demand information, or may include a location identifier of the customer sending the customer demand information, or both. The customer demand end may be used to receive voices said by the customer and may also be used to play audios. The audio may be understood as a voice including specific content and being fed back to the customer, or may be other audios such as music and prompts. The customer demand end may use any voice interaction device, for example, a smart speaker, a smart voice terminal, and the like, as long as the functions described in the present embodiment can be implemented. After receiving the voice demand instruction of the customer, the customer demand end may send its own identifier and the customer's voice demand instruction to a control center for identification through the customer demand information. The control center may include one or more servers with speech recognition functions. These servers may be arranged locally or in the cloud.

S200 includes performing a speech recognition on the voice demand instruction.

After receiving the customer demand information, the control center may determine the source of the voice demand instruction based on the customer demand end identifier. For example, if each room in the hotel includes a smart speaker, the room number has a corresponding relationship with the speaker identifier. The customer demand end identifier may include a room number and/or a speaker identifier. If the customer demand end identifier in the customer demand information includes the speaker identifier, the corresponding room number may be found based on the speaker identifier. If the customer demand end identifier in the customer demand information includes the room number, the corresponding speaker identifier may also be found based on the room number. Therefore, after receiving the customer demand information, the control center may determine which room and/or which speaker the voice demand instruction comes from based on the customer demand end identifier.

The voice demand instruction may be understood as audio information with specific content said by the customer. For example, the voice demand instruction may include, but is not limited to, "I need a pair of slippers", "Please clean my room", "Please send dinner to my room" and other audio information with service demands. The control center performs a speech recognition on the voice demand instruction, and may obtain what service the customer needs, that is, a demanded service type.

S300 includes if a demanded service type in the voice demand instruction is identified, sending a service-providing request to a service management system based on the demanded service type, the service-providing request including the customer demand end identifier and the demanded service type.

In an embodiment, the control center may send the identified demanded service type and customer demand end identifier to a specific service management system through a service-providing request. After receiving the service-providing request, the service management system provides specific services for the customer demand end, may arrange the service staff to provide the corresponding demand service to the customer, and may also provide automatic service. In an actual application scenario, the services may be determined by the actual functions of a service providing system. For example, the control center sends "slippers" and "room X" to the service management system of the hotel. After receiving the service-providing request, the service management system of the hotel may arrange a specific person to send slippers to room X. For another example, the control center sends "book an air ticket for someone from A to B on a certain day" and "room X" to the service management system of the hotel. After receiving the service-providing request, the service management system of the hotel may book an air ticket for a specified person in Room X.

If the service-providing request sent by the control center to the service management system include only the speaker identifier, the room number corresponding to the speaker identifier may also be queried in the service management system.

In an embodiment, the method further includes: feeding back a service-providing result to the customer demand end, based on the customer demand end identifier. The feeding back a service-providing result to the customer demand end may be performed simultaneously with the sending of the service-providing request to the service management system, or after the service management system performs the arrangement and provides the service. For example, when the demanded service type in the voice demand instruction of the customer is identified, the customer may be informed that the corresponding demanded service will be performed. For another example, after receiving the service-providing request, and arranging the service staff to provide the corresponding demanded service, the service management system feeds back the result to the customer demand end, informing the customer that the corresponding demanded service will be performed. The present embodiment does not limit the specific timing of feeding back the service-providing result, and the timing may be flexibly selected based on the content of the service-providing result fed back. For example, the feedback such as "we will provide you with slippers" and "we will book the air ticket for you", may be sent at the same time when the service-providing request is sent to the service management system. For another example, the service management system may perform the arrangement and provide the service feedback such as "we have arranged the staff to provide you the slippers before 10 o'clock", or "your air ticket has been successfully booked".

In addition, the feedback of the service-providing result to the customer demand end may be performed multiple times based on the progress of the processing of the service management system.

In a specific implementation, the feeding back a service-providing result to the customer demand end, based on the customer demand end identifier, includes:

generating corresponding feedback text information based on the content of the service-providing request;

converting the feedback text information into a feedback voice; and sending the feedback voice to a voice interaction device of the customer demand end corresponding to the customer demand end identifier. The voice interaction device informs the customer of the service-providing result.

For example, the content of the service-providing request is "I need a pair of slippers", and the generated feedback text information is "We will send the slippers to your room immediately." Alternatively, the generated feedback text information is "We have received your request and we will arrange the service as soon as possible." The feedback text information may be a correlation reply to the content of the specific service request, or may be a simple reply confirming receipt of the service-providing request.

In an embodiment, the performing a speech recognition on the voice demand instruction, includes:

converting the voice demand instruction into demand text information;

matching the demand text information with legal text information recorded in a database. Here, the legal text information may be understood as information that records different service types.

In another embodiment, the performing a speech recognition on the voice demand instruction, further includes: if the legal text information including an identical content as the content of the demand text information is found through the matching, determining that the recognition is successful.

If the legal text information including the identical content as the content of the demand text information is not found through the matching, determining that the recognition fails.

In a specific implementation, if the speech recognition performed on the voice demand instruction fails, the corresponding recognition failure text information is generated based on the result of the speech recognition failure. The recognition failure text information is converted into a feedback voice and sent to the voice interaction device of the customer demand end corresponding to the customer demand end identifier. The voice interaction device informs the customer of the recognition failure result.

In an alternative implementation, if the speech recognition performed on the voice demand instruction fails, while the failure result is fed back to the customer, a corresponding prompt voice may also be given, and the prompt voice is used to guide the customer to give a correct voice demand instruction. The prompt voice may include a description of service types recorded in the database for the customer to select. In addition, the customer may be asked if the demanded service is a certain service type recorded in the database through the customer's voice demand instruction.

Figure 2:
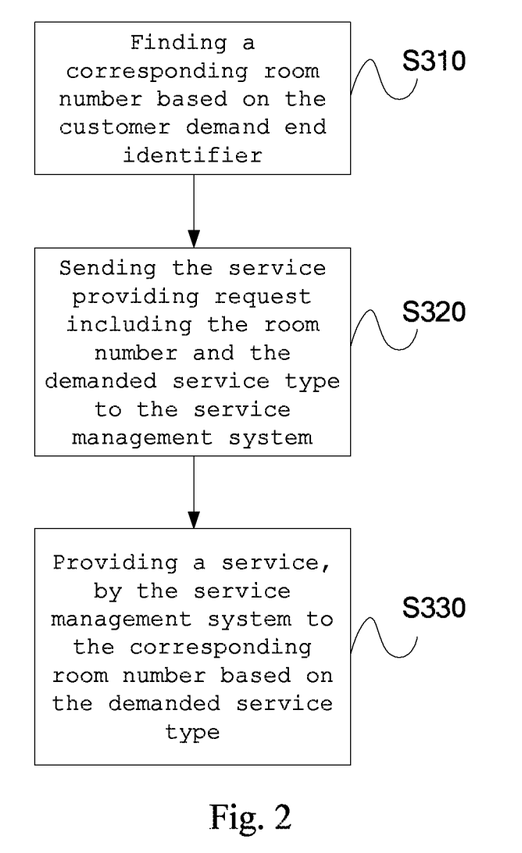
FIG. 2 is a specific flowchart of step S300 according to an embodiment of the present disclosure.

In an embodiment, as shown in FIG. 2, the sending a service-providing request to a service management system based on the demanded service type includes steps S310 to S330.

S310 includes: finding a corresponding room number based on the customer demand end identifier. Here, the customer demand end may be disposed in the room.

S320 includes: sending the service-providing request including the room number and the demanded service type to the service management system.

S330 includes: providing a service, by the service management system, to the corresponding room number based on the demanded service type.

In an embodiment, in order to avoid that the customer demand end is always in the state of receiving the customer voice, a wake-up sentence may be set to wake up the customer demand end. Only after the customer says the corresponding wake-up sentence, the customer demand end can receive and recognize the service demand said by the customer. For example, the wake-up word may be "Xiadu Xiadu", and only after saying "Xiadu Xiadu" the customer can say his service demand.

Figure 3:
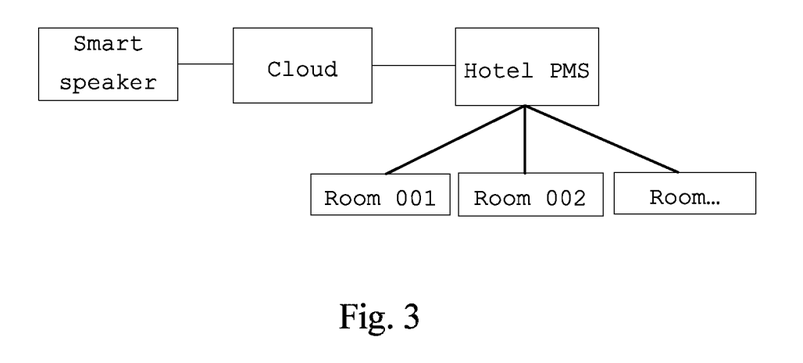
FIG. 3 is a structural block diagram of a voice interaction method for a customer service based on a hotel scenario according to an embodiment of the present disclosure.

As shown in FIG. 3, in a specific embodiment, when the method of the embodiments of the present disclosure is applied to a hotel scenario, the method is as follows.

A smart speaker is arranged in each room of the hotel, and the audio equipment is used as the customer demand end to receive voice service demands of the customer. Each room has a corresponding room number, for example: room-001. Each smart speaker also has its own unique customer demand end identifier, i.e., the ID number, for example: decice-001. In addition, the room number of each room is bound to the customer demand end identifier of the audio equipment in the room. The room number of the room may be found through the customer demand end identifier, or the smart speaker in the room may also be found through the room number.

A tenant staying in the hotel room may interact with the smart speaker to express his own demand and inform the hotel to provide corresponding customer service. The tenant first says the wake-up sentence to wake up the smart speaker in the room (for example, the wake-up sentence is "XiaduXiadu"). Then, the tenant says his own demand, "I want a pair of slippers." After receiving the voice demand instruction from the customer, the smart speaker sends the customer demand information to the hotel server (for example, the cloud). Here, the customer demand information includes the customer demand end identifier of the smart speaker and the voice demand instruction processed by the smart speaker.

The hotel server performs a speech recognition on the received voice demand instruction. The voice demand instruction is converted into demand text information, and the demand text information is matched with legal text information recorded in the database. If the legal text information including the identical content as the content of the demand text information in the database is found through the matching, the recognition is successful. After the successful recognition, the hotel server sends a request for providing the service to a property management system (PMS), which is an example of a service management system. The PMS finds the room number of the room where the smart speaker is located based on the customer demand end identifier of the smart speaker. For example, the guest in room-001 needs a pair of slippers. According to the demand of the customer, the PMS may arrange the service staff to perform the specific service.

At the same time, the customer management system may give the server a reply, and the server may generate corresponding feedback text information based on the content of the service-providing request. For example, "Ok, we will arrange the service staff to send you a pair of slippers, please wait a minute." Then, the feedback text information is synthesized into voice stream information (i.e., a feedback voice), and the feedback voice is sent to the smart speaker in room number room-001. The smart speaker may inform the customer "Ok, we will arrange the service staff to send you a pair of slippers, please wait a minute" in audio form, thereby satisfying the customer's demand. The process of synthesizing the voice stream information may adopt a TTS (text to speech) technology.

Figure 4:
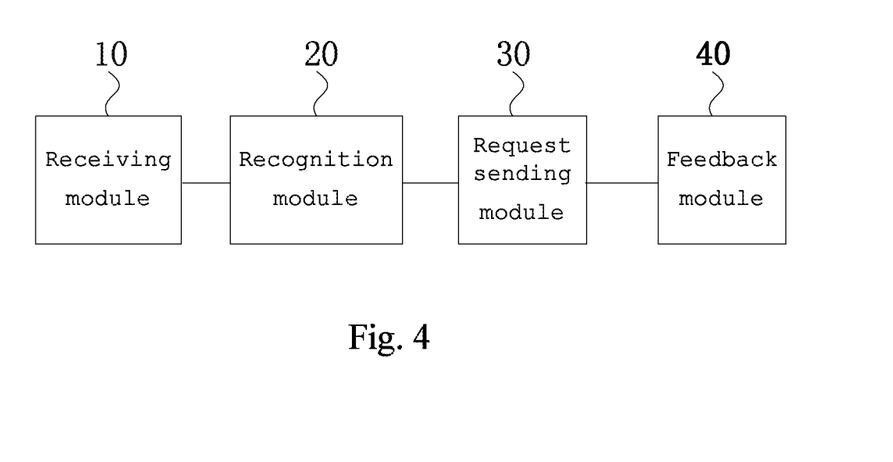
FIG. 4 is a schematic structural diagram of a voice interaction apparatus for a customer service according to an embodiment of the present disclosure.

The embodiments of the present disclosure provide a voice interaction apparatus for a customer service. As shown in FIG. 4, the apparatus includes:

a receiving module 10, configured to receive customer demand information from a customer demand end, the customer demand information including a customer demand end identifier and a voice demand instruction;

a recognition module 20, configured to perform a speech recognition on the voice demand instruction; and a request-sending module 30, configured to, if a demanded service type in the voice demand instruction is identified, send a service-providing request to a service management system based on the demanded service type, the service-providing request including the customer demand end identifier and the demanded service type.

In an embodiment, as shown in FIG. 4, the apparatus further includes: a feedback module 40, configured to feedback a service-providing result to the customer demand end, based on the customer demand end identifier.

In an embodiment, the recognition module 20 includes:

a first conversion submodule, configured to convert the voice demand instruction into demand text information; and a matching submodule, configured to match the demand text information with legal text information recorded in a database. If the data base includes the legal text information having the identical content as the content of the demand text information, the recognition is successful.

In an embodiment, the request sending module 30 includes:

a querying submodule, configured to find a corresponding room number based on the customer demand end identifier; and a first sending submodule, configured to send the service-providing request including the room number and the demanded service type to the service management system.

In an embodiment, the feedback module 40 includes:

a generation submodule, configured to generate feedback text information based on the demanded service type;

a second conversion submodule, configured to convert the feedback text information into a feedback voice; and a second sending submodule, configured to send the feedback voice to a speaker corresponding to the customer demand end identifier.

Figure 5:
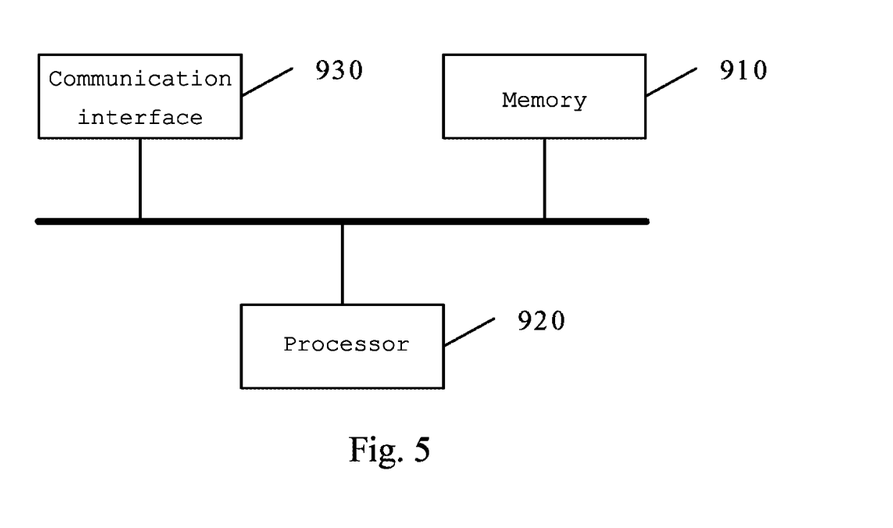
FIG. 5 is a schematic structural diagram of a voice interaction terminal for a customer service according to an embodiment of the present disclosure.

The embodiments of the present disclosure provide a voice interaction terminal for a customer service. As shown in FIG. 5, the terminal includes:

a memory 910 and a processor 920. A computer program executable on the processor 920 is stored in the memory 910. The voice interaction method for a customer service in the above embodiments is implemented when the processor 920 executes the computer program. The number of the memory 910 and the processor 920 may be one or more.

A communication interface 930 is used for the external communication of the memory 910 and the processor 920.

The memory 910 may include a high-speed RAM memory and may also include a non-volatile memory such as at least one disk memory.

If the memory 910, the processor 920, and the communication interface 930 are implemented independently, the memory 910, the processor 920, and the communication interface 930 may be connected to each other through a bus and complete communication with each other. The bus may be an Industrial Standard Architecture (ISA) bus, a Peripheral Component (PCI) bus, or an Extended Industry Standard Component (EISA) bus. The bus may be classified as an address bus, a data bus, a control bus, and the like. For ease of representation, only one thick line is shown in FIG. 5, which does not mean that there is only one bus or one type of bus.

Alternatively, in a specific implementation, if the memory 910, the processor 920, and the communication interface 930 are integrated on one chip, the memory 910, the processor 920, and the communication interface 930 may complete communication with each other through an internal interface The embodiments of the present disclosure provide a computer readable storage medium, storing a computer program thereon, the program, when executed by a processor, implements the method for a customer service according to any one of the above embodiments.

The technical solution of the embodiments of the present disclosure realizes the interaction between the customer demand end, the service management system and the customer by adopting the voice interaction method, so that the demand of the user can be quickly and intelligently identified and the corresponding service can be provided, without too much manual intervention. As such the installation of telephone equipment and the arrangement of customer service personnel may be effectively saved, and service costs are saved. The technical solution of the embodiments of the present disclosure can also improve the customer experience and conveniently and quickly complete the customer demand. Furthermore, the needs of multiple customers can be met simultaneously, avoiding the situation that the line is busy when making the phone call.

In the description of the present specification, the reference terms "one embodiment", "some embodiments", "an example", "specific example", or "some examples" and the like means a specific feature, structure, material or characteristic described in connection with the embodiment or example is included in at least one embodiment or example of the present disclosure. Furthermore, the specific feature, structure, material, or characteristic described may be combined in a suitable method in any one or more embodiments or examples. In addition, various embodiments or examples described in the specification and features of various embodiments or examples may be combined and connected without departing from the scope of the present disclosure by those skilled in the art.

Moreover, the terms "first" and "second" are used for descriptive purpose only and are not to be construed as indicating or implying a relative importance or implicitly indicating the number of technical features indicated. Thus, "first" and "second" feature may include at least one feature, either explicitly or implicitly. In the description of the present disclosure, the meaning of "a plurality" is two or more unless clearly and specifically defined otherwise.

Any process or method description in the flowcharts or otherwise described herein may be understood to represent a module, segment or portion of code that includes one or more executable instructions for implementing the steps of a particular logical function or process. In addition, the scope of the preferred embodiments of the present disclosure includes additional implementations, in which the functions may be performed in a substantially simultaneous way or in the reverse order, and may not be performed in the order shown or discussed, which can be understood by those skilled in the art to which the embodiments of the present disclosure belong.

The logic and/or steps represented in the flowchart or otherwise described herein, for example, may be considered as an ordered list of executable instructions for implementing logical functions, and may be embodied in any computer readable medium, for being used by an instruction execution apparatus, apparatus, or device (e.g., a computer-based device, an apparatus including a processor, or other apparatus that can acquire instructions and execute the instructions from the instruction execution apparatus, apparatus, or device), or used in conjunction with the instruction execution apparatus, apparatus, or device. In the context of the present specification, the "computer readable medium" may be any apparatus that may contain, store, communicate, propagate, or transport a program for use by the instruction execution apparatus, apparatus, or device, or in conjunction with the instruction execution apparatus, apparatus, or device. More specific examples (non-exhaustive list) of the computer readable medium include the following: electrical connections (electronic apparatuses) having one or more wires, portable computer disk cartridges (magnetic apparatuses), random access memory (RAM), read only memory (ROM), erasable editable read only memory (EPROM or flash memory), fiber optic apparatuses, and portable read only memory (CDROM). In addition, the computer readable medium may even be a paper or other suitable medium on which the program may be printed, and the program may be obtained electronically, for example, by optical scanning of the paper or other medium, followed by editing, interpretation or, if necessary, processing in other suitable method, and then storing the program in a computer memory.

It should be understood that portions of the present disclosure may be implemented in hardware, software, firmware or a combination thereof. In the above-described embodiments, multiple steps or methods may be implemented in software or firmware stored in the memory and executed by a suitable instruction execution apparatus. For example, if implemented in hardware, as in another embodiment, the methods or steps may be implemented by any one or combination of the following techniques well known in this art: discrete logic circuits with logic gates for implementing logic functions on data signals, Application Specific Integrated Circuit (ASIC) with appropriate combinational logic gates, programmable gate arrays (PGAs), field programmable gate arrays (FPGAs), and the like.

Those skilled in the art may understand that all or part of the steps included in the method of implementing the above embodiments may be completed by a program to instruct related hardware, and the program may be stored in a computer readable storage medium. The program, when executed, includes one or a combination of the steps of the method embodiments.

In addition, the functional units in the embodiments of the present disclosure may be integrated in one processing module, each unit may exist physically and separately, or two or more units may be integrated in one module. The above integrated modules may be implemented in the form of hardware or in the form of software functional modules.

The integrated modules, if implemented in the form of software functional modules and sold or used as separate products, may also be stored in a computer readable storage medium. The storage medium may be a read only memory, a magnetic disk or an optical disk, or the like.

The above is only a specific embodiment of the present disclosure, but the scope of the present disclosure is not limited thereto, and any variation or substitution of the present disclosure within the scope of the technology disclosed herein will be readily apparent to those skilled in the art, and should be covered by the scope of the present disclosure. Therefore, the scope of the present disclosure should be determined by the scope of the appended claims.

What is claimed is:

1. A voice interaction method for a customer service, the method comprising:
   receiving customer demand information from a customer demand end, the customer demand information comprising a customer demand end identifier and a voice demand instruction;
   performing a speech recognition on the voice demand instruction, where the performing a speech recognition on the voice demand instruction comprises: converting the voice demand instruction into demand text information and matching the demand text information with service types recorded in a database, the service types comprising services in a hotel;
   in response to determining that a demanded service type in the voice demand instruction is identified, sending a service-providing request to a service management system based on the demanded service type, the service-providing request comprising the customer demand end identifier and the demanded service type;
   generating feedback text information based on the demanded service type, the feedback text information comprising a reply confirming that the service-providing request has been received and the customer service will be provided, wherein the feedback text information comprises a feedback that a ticket will be booked, wherein the feedback text information comprises a feedback that a requested item will be provided before a specific time; and
   feeding back the feedback text information to the customer demand end, based on the customer demand end identifier.

2. The method according to claim 1, wherein the performing a speech recognition on the voice demand instruction comprises:
   determining that the speech recognition is successful, if the service type including an identical content as a content of the demand text information is found through the matching.

3. The method according to claim 1, wherein the sending a service-providing request to a service management system based on the demanded service type comprises:
   finding a corresponding room number based on the customer demand end identifier; and
   sending the service-providing request comprising the room number and the demanded service type to the service management system.

4. The method according to claim 1, wherein the feeding back the feedback text information to the customer demand end, based on the customer demand end identifier, comprises:
   converting the feedback text information into a feedback voice; and
   sending the feedback voice to a voice interaction device of the customer demand end corresponding to the customer demand end identifier.

5. The method according to claim 1, further comprising:
   determining that a service type matching the demand text information is not found through the matching; and
   in response to determining that the service type matching the demand text information is not found through the matching, providing a prompt voice including a description of the service types recorded in the database.

6. The method according to claim 1, wherein the feedback text information comprises a feedback that a slipper will be provided.

7. The method according to claim 1, wherein the feedback that the ticket will be booked is a voice that the ticket will be booked.

8. A voice interaction apparatus for a customer service, the apparatus comprising:
   at least one processor; and
   a memory storing instructions, wherein the instructions when executed by the at least one processor, cause the at least one processor to perform operations, the operations comprising:
   receiving customer demand information from a customer demand end, the customer demand information comprising a customer demand end identifier and a voice demand instruction;
   performing a speech recognition on the voice demand instruction, where the performing a speech recognition on the voice demand instruction comprises: converting the voice demand instruction into demand text information and matching the demand text information with service types recorded in a database, the service types comprising services in a hotel;
   in response to determining that a demanded service type in the voice demand instruction is identified, sending a service-providing request to a service management system based on the demanded service type, the service-providing request comprising the customer demand end identifier and the demanded service type;
   generating feedback text information based on the demanded service type, the feedback text information comprising a reply confirming that the service-providing request has been received and the customer service will be provided, wherein the feedback text information comprises a feedback that a ticket will be booked, wherein the feedback text information comprises a feedback that a requested item will be provided before a specific time; and
   feeding back the feedback text information to the customer demand end, based on the customer demand end identifier.

9. The apparatus according to claim 8, wherein the performing a speech recognition on the voice demand instruction comprises:
   matching the demand text information with legal text information recorded in a database;
   and determining that the recognition is successful, if the service type including an identical content as a content of the demand text information is found through the matching.

10. The apparatus according to claim 8, wherein the sending a service-providing request to a service management system based on the demanded service type comprises:

finding a corresponding room number based on the customer demand end identifier; and sending the service-providing request comprising the room number and the demanded service type to the service management system.

11. The apparatus according to claim 8, wherein the feeding back the feedback text information to the customer demand end, based on the customer demand end identifier, comprises:

converting the feedback text information into a feedback voice; and sending the feedback voice to a voice interaction device of the customer demand end corresponding to the customer demand end identifier.

12. A non-transitory computer readable storage medium, storing a computer program thereon, the program, when executed by a processor, causes the processor to perform operations, the operations comprising:

receiving customer demand information from a customer demand end, the customer demand information comprising a customer demand end identifier and a voice demand instruction;

performing a speech recognition on the voice demand instruction, where the performing a speech recognition on the voice demand instruction comprises: converting the voice demand instruction into demand text information and matching the demand text information with service types recorded in a database, the service types comprising services in a hotel;

in response to determining that a demanded service type in the voice demand instruction is identified, sending a service-providing request to a service management system based on the demanded service type, the service-providing request comprising the customer demand end identifier and the demanded service type;

generating feedback text information based on the demanded service type, the feedback text information comprising a reply confirming that the service-providing request has been received and the customer service will be provided, wherein the feedback text information comprises a feedback that a ticket will be booked, wherein the feedback text information comprises a feedback that a requested item will be provided before a specific time; and feeding back the feedback text information to the customer demand end, based on the customer demand end identifier.

* * * * *

UNITED STATES PATENT AND TRADEMARK OFFICE
CERTIFICATE OF CORRECTION

| | | |
|---|---|---|
| PATENT NO. | : 11,257,492 B2 | Page 1 of 1 |
| APPLICATION NO. | : 16/354794 | |
| DATED | : February 22, 2022 | |
| INVENTOR(S) | : Xiantang Chang | |

It is certified that error appears in the above-identified patent and that said Letters Patent is hereby corrected as shown below:

On the Title Page

Item (73) ASSIGNEE(S):
"BAIDU ONLINE NETWORK TECHNOLOGY (BEIJING) CO., LTD., Beijing (CN)"
Should read:
--BAIDU ONLINE NETWORK TECHNOLOGY (BEIJING) CO., LTD., Beijing (CN); SHANGHAI XIAODU TECHNOLOGY CO. LTD., Shanghai (CN)--.

Signed and Sealed this
Ninth Day of May, 2023

Katherine Kelly Vidal
*Director of the United States Patent and Trademark Office*